Feb. 14, 1956 E. F. SAUNDERS ET AL 2,734,334
STRAND BREAK DETECTING APPARATUS
Filed Dec. 27, 1950 4 Sheets-Sheet 1
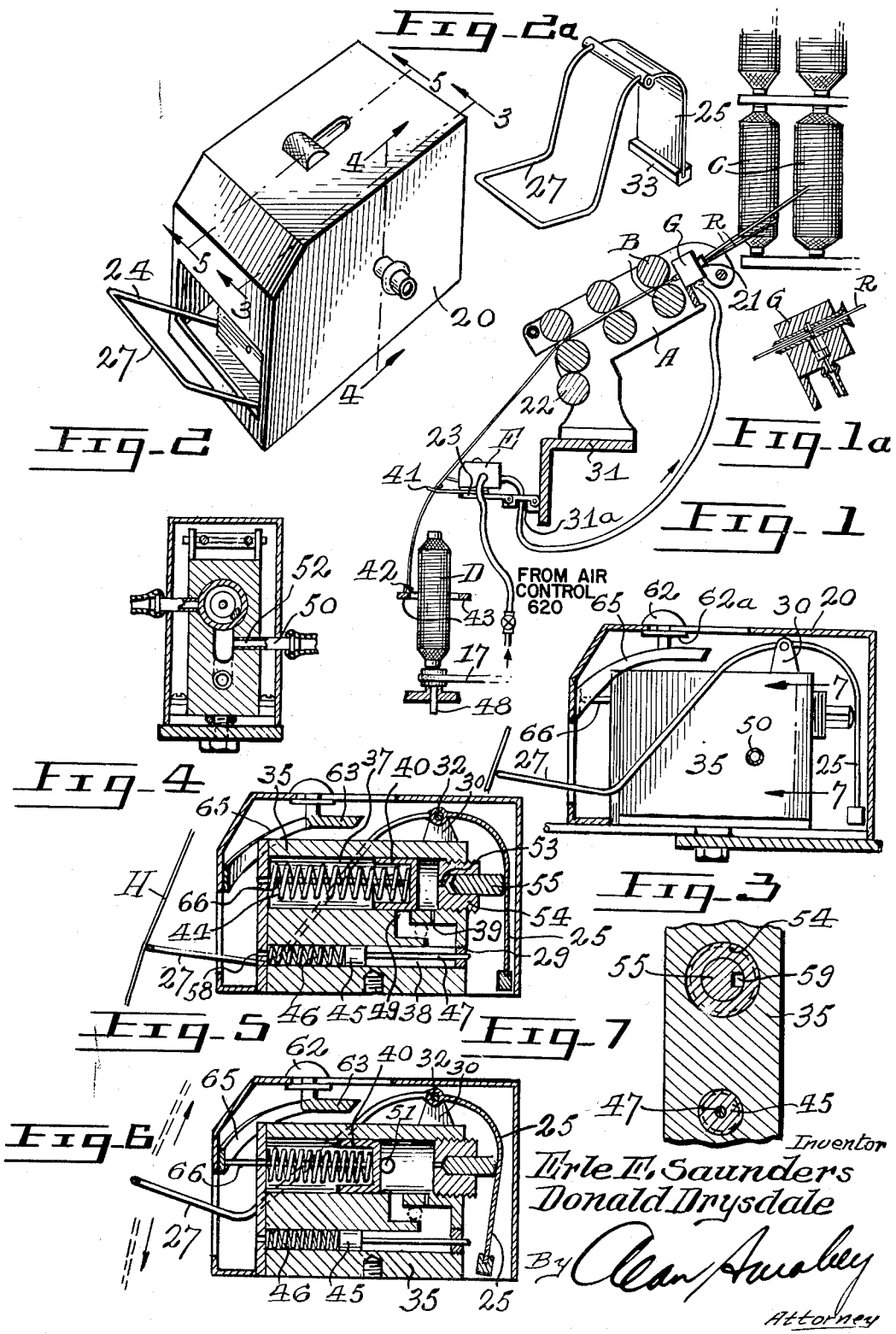
Inventor
Erle F. Saunders
Donald Drysdale
By Alan Ausubey
Attorney

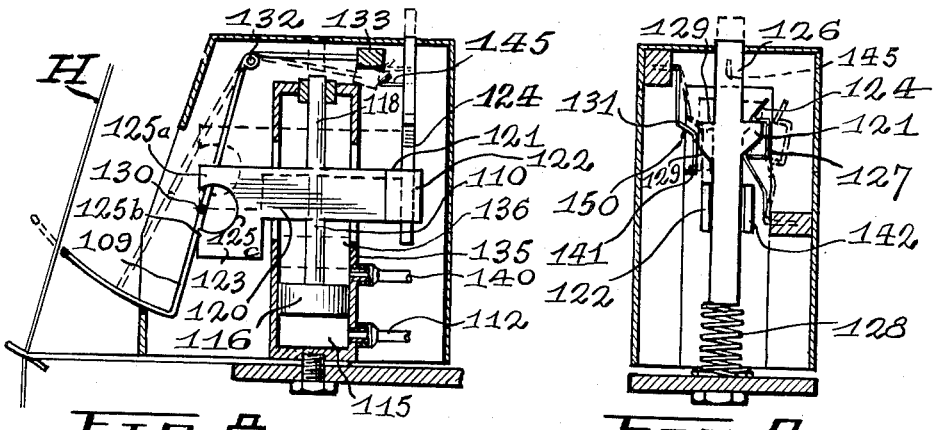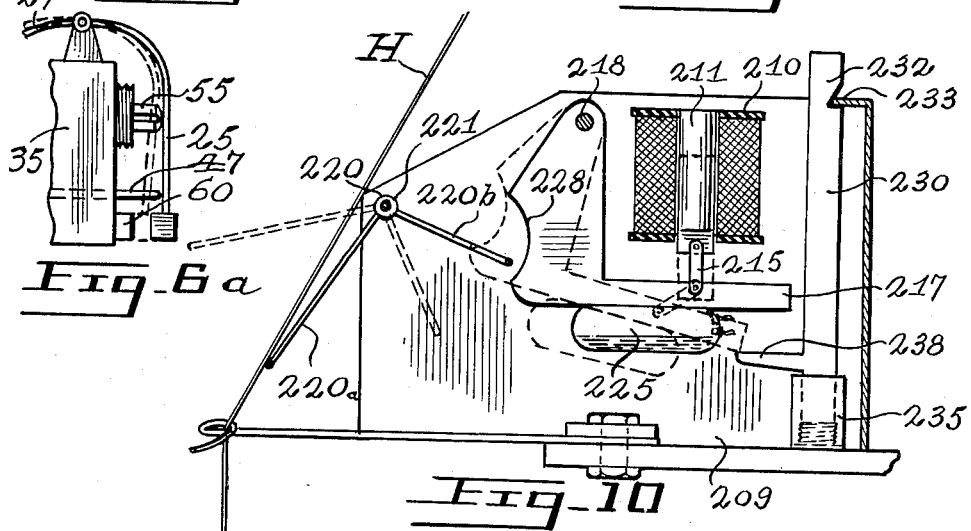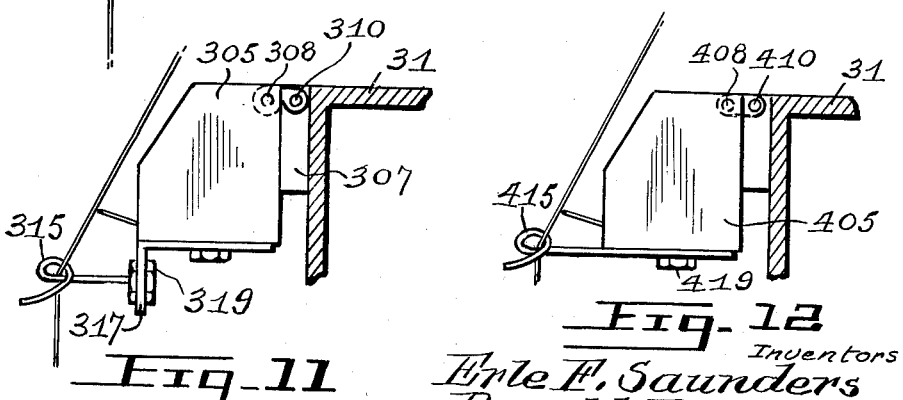

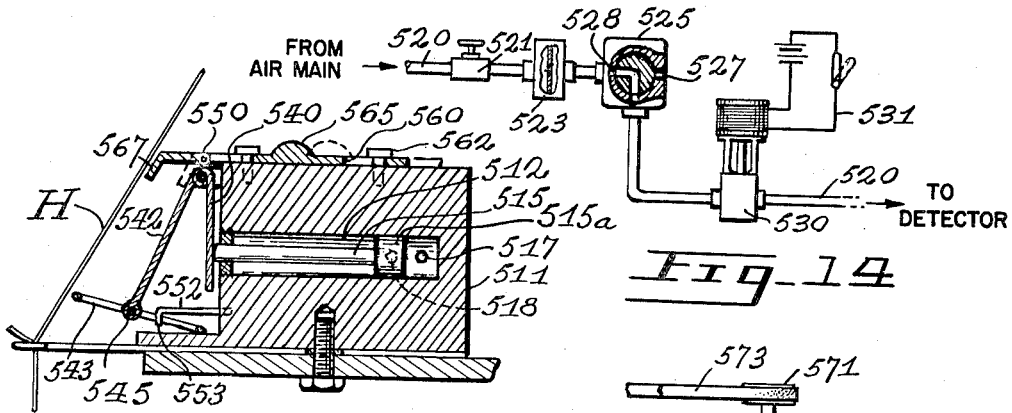
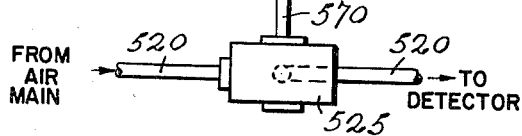
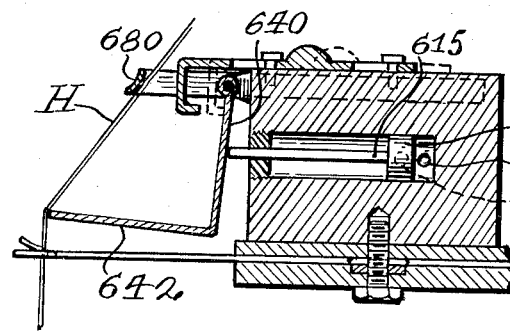
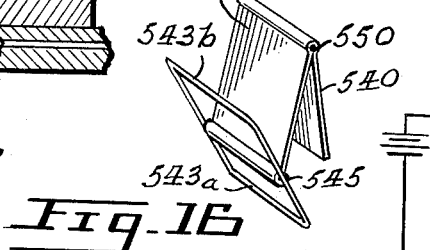
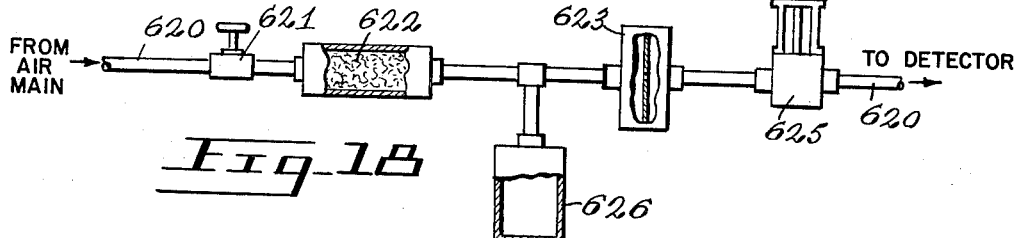
Inventors
Erle F. Saunders
Donald Drysdale
By Alan Ausaley
Attorney

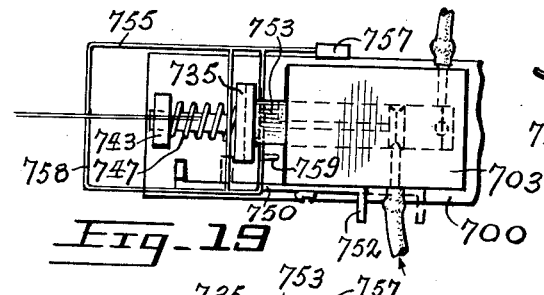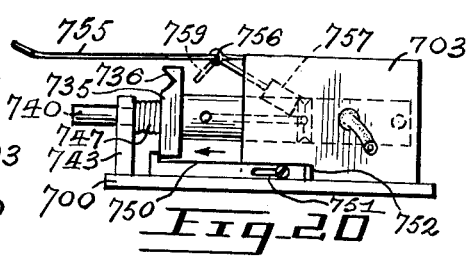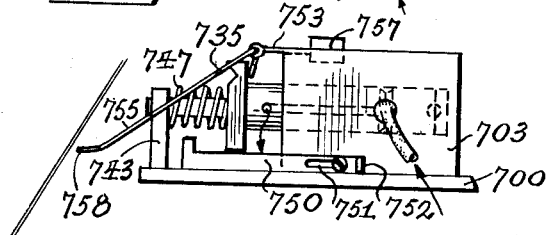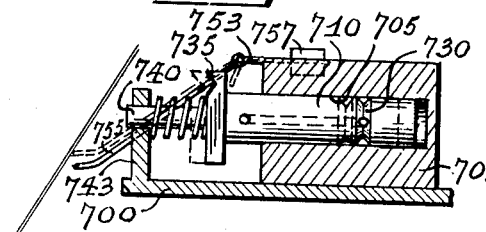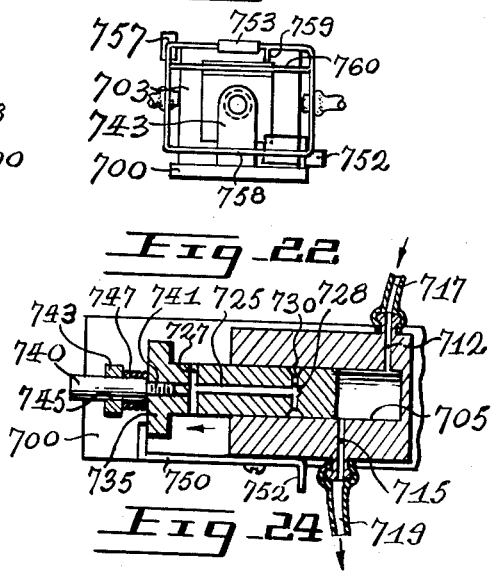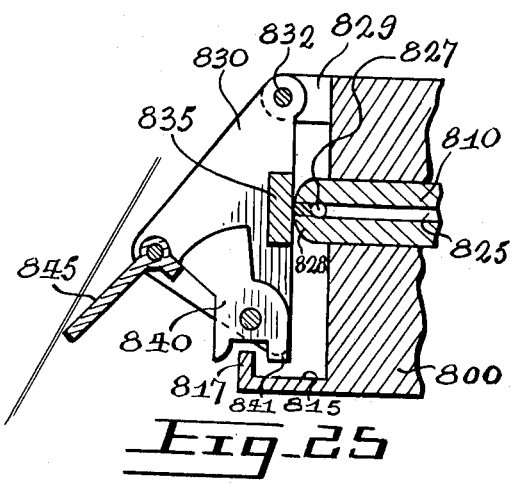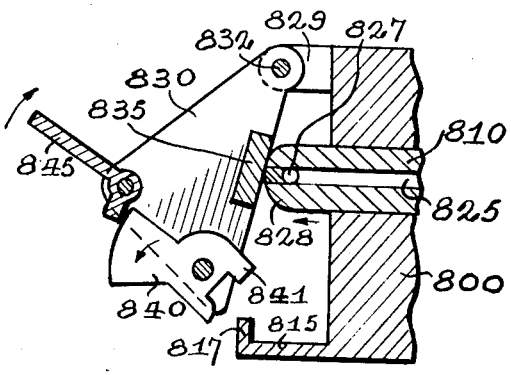

United States Patent Office 2,734,334
Patented Feb. 14, 1956

2,734,334

STRAND BREAK DETECTING APPARATUS

Erle F. Saunders, Montreal West, Quebec, Canada, and Donald Drysdale, Philadelphia, Pa.

Application December 27, 1950, Serial No. 202,929

7 Claims. (Cl. 57—81)

This invention relates to improvements in strand break detecting apparatus for spinning frame and similar types of machinery.

This application is a continuation-in-part of application Serial No. 142,222 filed February 3, 1950, which issued as Patent 2,611,230. That application relates to a spinning frame equipped with strand-contacting means for each spindle for detecting an end break and means responsive to the detecting means for interrupting the corresponding roving prior to the point of entry between the drawing rolls.

PRESENT DEVELOPMENT

The present invention relates to improvements in end-break detecting mechanisms which can conveniently be and are preferably used in connection with the mechanism shown in application Serial No. 142,222, which issued as Patent 2,611,230. But, the mechanism of the present application is not necessarily limited to use with the invention of the prior application.

A detecting mechanism according to the invention includes the following features. It has a housing which includes a cylinder. A plunger operates in the cylinder. The plunger moves between a neutral position and an active position at which interrupting mechanism is operated. Preferably the plunger is actuated by fluid pressure. For this purpose, an inlet port may be provided behind the plunger and an outlet port in front of the plunger. The outlet port is adapted to be opened by the movement of the plunger.

A sensing member is mounted on the housing for movement between a neutral position and a position in which the sensing member participates in an interrrupting impulse. The sensing member is preferably pivoted for movement between the neutral position and the active position.

Means is provided for urging the sensing member from neutral to active position. This means may or may not include the plunger. In one form of device means independent of the plunger urges the sensing member towards active position. This means may, for example, be a weight, a magnetic device or a spring. In this form of device, the sensing member is held by the pressure of the taut strand of fibers to be sensed from contacting the plunger. When the strand breaks the sensing member is urged against the plunger and sets interrupting instrumentalities into motion.

In another form of device, the plunger is urged towards active position independently of the sensing member. The sensing member is arranged so that, under the influence of the strand, it limits the movement of the plunger so that interrupting action does not take place.

Various other aspects of the invention will become apparent from the more detailed description of preferred forms, combinations, sub-combinations and individual features which will be described.

Certain forms of detecting unit, according to the invention, may be provided with a resetting member. This is usually a sliding member mounted on the top of the detector body.

A feature of the invention is the sensing member which may take several different forms. The sensing member generally includes a horizontal pivot or spindle. Depending from this spindle is a sensing part and a control part. In one form of the invention, the sensing part extends in one direction which, for the sake of convenience, we shall refer to as forward and downward, and the control part extends in another direction which we shall refer to as rearward and downward. The member is pivoted and balanced either so that it normally tends to engage a spinning end and is prevented from so doing by a movable member, or it is balanced so that it normally does not engage a spinning end but is caused to do so by the movable member.

Various specific forms which the sensing member can take will be described in the detailed description.

It is understood that the detecting units and sensing membes as described can be employed in different textile applications where it is desirable to sense an end break. Each detecting unit may be used in combination with an interrupting unit or with a signal or with a stop motion. A preferred use is in connection with the control of spinning operations as described in co-pending application Serial No. 142,222. It is understood that in this, or in analogous operations, a detecting unit is used for each spindle and there is a correspinding interrupting unit.

The invention will now be described in more detail by reference to the accompanying drawings illustrating perferred embodiments of it, and in which:

Figure 1 is a side elevation partly in section of the principal elements of a typical ring spinning frame equipped with control mechanism according to the invention.

Figure 1a is a vertical cross-section, in reduced scale, through a typical form of pneumatically operated interrupter unit.

Figure 2 is a perspective view of one form of detecting unit according to the invention.

Figure 2a is a perspective view of a detector element similar to that used in the detecting apparatus shown in Figure 2.

Figure 3 is a vertical cross-section along the line 3—3 of Figure 2 partly in elevation.

Figure 4 is a vertical transverse cross-section along the line 4—4 of Figure 2.

Figure 5 is a longitudinal vertical cross-section taken through the line 5—5 of Figure 2, partly in elevation, showing the parts of the mechanism in the position they occupy when the end is intact.

Figure 6 is a longitudinal vertical cross-section partly in elevation taken through the line 5—5 of Figure 2 showing the position of the parts of the mechanism after it has been actuated by an end break.

Figure 6a (sheet 2) is a fragmentary side elevation showing the special closing arrangement for the needle valve.

Figure 7 is an enlarged fragmentary vertical transverse cross-section along the line 7—7 of Figure 3.

Figure 8 is a diagrammatic vertical cross-section partly in elevation of an intermittently-acting pneumatically-operated detector mechanism.

Figure 9 is a diagrammatic vertical cross-section partly in elevation of the control mechanism for the detector shown in Figure 8.

Figure 10 is a diagrammatic side elevation partly in cross-section of an electrically-operated detector mechanism.

Figure 11 is a side elevation partly in section of a combination detector, lappet and thread guide arrangement.

Figure 12 is a view similar to that of Figure 11 but alternative in certain respects.

Figure 13 is a longitudinal vertical cross-section partly in elevation through an alternative form of intermittently acting detector.

Figure 14 is a diagrammatic elevation partly in section showing the control elements in the air feed line for the detectors shown in Figures 8 and 13.

Figure 15 is a diagrammatic sketch in plan of the rotating valve in the mechanism shown in Figure 14.

Figure 16 is a perspective view of the combined detecting and sensing element of Figure 13.

Figure 17 is a longitudinal vertical cross-section taken through a still further form of detecting unit.

Figure 18 is a diagrammatic elevation, partly in section of an air control mechanism for operating detecting mechanisms such as shown in Figures 2 and 17.

Figure 19 is a plan view, partly in section, of an alternative form of detector unit.

Figure 20 is a side elevation of the unit shown in Figure 19 in which the detecting element is in end broken position and in which air is being allowed to pass to the interrupter.

Figure 21 is a view of the detecting unit of Figures 19 and 20 in which the detecting element is in neutral position.

Figure 22 is a front elevation of the detecting unit shown in Figures 19, 20 and 21.

Figure 23 is a vertical cross-section, partly in elevation, of the unit shown in Figures 19 through 22 with the detecting element shown in neutral and sensing positions.

Figure 24 is a horizontal cross-section, partly in plan, through the unit of Figures 19 through 23, showing the relative position of the piston and ports when air is being allowed to pass to the interrupter.

Figure 25 is a fragmentary vertical cross-section, partly in elevation, of a still further form of detector unit with the detecting element in sensing position with the strand intact.

Figure 26 is a fragmentary vertical cross-section, partly in elevation, of the unit of Figure 25 with the detecting element in end broken position.

DETAILED DESCRIPTION

Now refer more particularly to the drawings. The general arrangement of a spinning frame and mechanism, according to the invention, is as follows. Sufficient of the conventional spinning frame parts are described to make clear its relation to the parts of the invention. The use on a spinning frame is specific and illustrative only. The new detecting mechanism can be used for analogous purposes.

On the roll stand A are mounted the drafting rolls B extending the length of the frame. The rolls B draw roving from the bobbins C mounted in the spinning frame creel. Each roving R is drawn through a trumpet 21 (forming part of an interrupting mechanism), through the successive pairs of drawing rolls B, then through the thread guide 41 to the traveller 42 riding on the ring 43, and thence to the spindle bobbin D. An underclearer roll 22 on the roll stand A collects cotton fly and broken ends from the lower front drawing roll.

The roving R as it passes through the drawing rolls B is attenuated because each successive pair of drawing rolls B is geared to rotate faster than the previous pair. The twist is put into the strand of fibers by the relative rotating motions of the spindle and traveller as the yarn is drawn down from the drawing rolls through the thread guide 41 and traveller and wound on the bobbin. The spindle 48 and bobbin D are rotated by the tape 17, from a drive (not shown), while the traveller 42 is rotated on the ring 43 by the pull of the yarn. There are, of course, a number of spindles arranged side by side on the spinning frame each associated with the mechanism described for spinning a strand of fibers into yarn. The drawing rolls on both sides of the frame are driven through from a common source of power through gear trains at the end of the frame. The spindles are usually driven in fours, two on each side of the frame, by a tape-belt, the tapes being driven off a series of metal pulleys or drums mounted on a shaft running lengthwise through the base of the frame. The mechanism so far described in detail is conventional as will be recognized by those skilled in the art.

DETECTING MECHANISM

Unit of Figures 1 to 6

The detecting unit is contained in a casing 20, in which is mounted the mechanism proper. This includes a fly wire sensing element 24.

The detecting element is made up of a plate 25 and a fly wire end contacting portion 27 of essentially the conformation shown in Figure 2A. The detecting element 25 is mounted pivotally on a small bearing pedestal 30 as at 32. The pedestal 30 is mounted on the block 35. The bottom of the back of the plate 25 is provided with a counter-balance weight 33. It extends across the bottom rear edge of the plate 25.

The block 35 is provided with a large upper cylinder 37 and a small lower cylinder 38. Both extend lengthwise of the block, that is from back to front. In the cylinder 37 there operates a free piston 40 which is urged towards the back of the block by a spring 44. The lower cylinder has a piston 45 which is urged towards the back of the block by the spring 46.

The piston in the lower cylinder carries a rearwardly extending rod 47 which extends through a bushing 29 in the wall of the block. At the side of the block is an air intake port 50 which connects with a passage 52 in the block leading in rear of the pistons in both cylinders. In the back of the large cylinder 37 is a bushing 54 with a fine orifice 53 and this bushing holds a needle valve 55.

The cylinder 38 has a release orifice 58 to bleed off any air leaking past the piston. The needle valve 55 has a slot 59 in its side which allows air to discharge.

A resetting push button 62 rides tightly with a spring 62a washer in a groove in the top of the case which has a rearward projection 63 and a forward projection 65 within the case. From the forward projection 65 a small rod 66 extends into the top cylinder and then to the back of the piston.

Operation

In operation, the spinning end H is normally sensed by the portion of the fly wire 27 of adequate width to maintain contact with the end. While the end is intact the fly wire is held "in" by the strand of fibers being spun.

This position is shown in Figures 2, 3 and 5. When the end breaks it no longer holds "in" the front of the fly wire and the fly wire is caused, by the counter-weight 33, to rotate about the pivot 32 into the position shown in Figure 6. By reason of this motion the plate 25 "seats" the needle valve 55 thus closing the port 53.

While the strand is intact and the needle valve is in the "out" position, air enters the large cylinder 37 in front of the piston through the small orifice 39 and then exhausts through the port 53. When the needle valve 55 is pushed "in" the port 53 is blocked and air pressure builds up in front of the piston 40 from air entering through the orifice 39. As the air pressure builds up it moves the piston 40 to the left (in the figure) past the port 49 which is the main air intake into the cylinder. On continuing its movement, the piston 40 advances past the port 51 which forms the air connection to the interrupter. Air passing through this port 51 to the interrupter causes actuation of the latter and interruption of the roving by the interrupting mechanism G.

When the attendant comes to piece up, he first pushes the control button 62 from forward to rearward position. By this action the extension 66 extending into the cylinder pushes the piston forward past both ports and holds it in this position until piecing up is completed.

By the same movement the fly wire 27 is retracted by action of the extension 63 on the fly wire and the rear plate 25 is carried away from the needle valve 55; then the air pressure in the cylinder pushes the needle valve "out" thus allowing the bleeding of air from in front of the piston 40. The spring 42 then holds the piston 40 in its right hand position and from this position the mechanism is ready to continue its testing as soon as the control button 62 is moved to its forward position, when piecing up is completed.

As long as the air pressure is maintained through the passages it enters the cylinder 38 behind the piston 45 thus holding it in left hand position against the action of the spring 46. Should, however, the power fail, a solenoid release valve (see Figure 14, number 525) in the air line would operate and allow the air to be quickly exhausted reducing the pressure so that the spring 46 would move the piston 45 into a right hand position. In this movement the rod 47 contacts the plate 25 and holds it in rearward position thus retracting the fly wire and preventing it from tripping the interrupter should the end go slack.

Should more force be required to close the needle valve 55 than would normally be achieved by the acting of the counter-weight 33 a small permanent magnet 60 can be attached to the block, as shown in Figure 6a, and at the end of the inward motion of the plate 25. Its attraction can be used to carry the needle valve "home."

Unit of Figures 8 and 9

Figure 8 shows a type of detector employing an intermittent detecting motion.

The device of Figure 8 employs a detector wire 109 pivoted as at 132 and counter-balanced by weight 133. A vertical cylinder 135 is provided with a piston chamber 136 in which a piston assembly 110 rides up and down. Air is admitted to the lower portion of the cylinder 115. The piston is provided with a head 116 and a piston rod 118, to which rod is attached a cross-head having a forward extension 120 and a rearward extension 121. The forward extension, forms the control element for the fly wire and is provided with a large head 123 having a rearwardly extending recess 125 of generally circular shape having an upper face 125a, a lower face 125b, and a rear face 125c. The fly wire 109 has a cross bar 130 which normally remains within the circular area defined by the opening 125 as long as the end is intact. When the piston 116 is at the lower end of the stroke the cross bar 130 is held in the upper section by the face 125a. As the piston moves upward, the cross bar is released and the fly wire is free to move outward unless it is retained by the spinning end in which case the cross bar is caught by the lower section 125b as the piston moves upward. This stops the upward movement of the piston and the action is reversed as air pressure exhausts. The intermittent motion may be produced by suitable means as, for example, by the control mechanism shown in Figure 14.

This intermittent motion is continued as long as the spinning end H remains intact. When the end H is broken the fly wire swings outward. The piston 116 then moves upward. It is not stopped by the cross bar 130 and so continues its motion until the piston head 116 passes the port 140 which is the connection to the interrupter. When the piston 116 passes the port 140 air is allowed to pass to the interrupter which actuates it to sever the roving.

As the piston continues to rise on its interrupter actuating movement, the prong 122 of the rearward projection 121 contacts the spring catch 124 and pushes it away from the control riser cam 126 which allows the riser to move upward under influence of the spring 128.

As the control riser 126 moves upwards, the cam 129 on the control riser moves past the cam-bearing portions 130 of the spring 131 allowing it to move inward. Inward motion of the spring 131 is stopped when its end 141 bears on the prong 122 of the rearward piston assembly projection 121.

On the return stroke of the piston assembly the head of the spring 141 passes in over the top of the prong 122 and holds the piston assembly against another upward movement until the attendant resets the mechanism.

A very light spring wire 145 attached to the riser bears underneath the rearwardly extending arm of the fly wire 133 and thus causes the testing end to be withdrawn.

After piecing up, the attendant pushes the riser 127 down and thus retracts the spring 131 so that the testing motion of the piston may operate. The cam 126 is pushed into the catch portion of the spring 124 and the riser is thus held down.

Unit of Figure 10

Figure 10 shows a solenoid-actuated detecting mechanism. The solenoid is represented by 210 and has a core 211 which is pivotally connected by a link 215 to a swinging arm 217 which is hinged as at 218 to the frame 209. A fly wire 220 is pivotally mounted on the frame as at 221 and is free to swing. The fly wire's front portion 220a is designed to make contact with the end being spun, the rear portion 220b overweights the front portion. When the fly wire 220 is allowed to swing free it will assume the position shown in dotted lines in Figure 10. When not held by the wire the arm 217 also assumes the position shown in dotted lines. The arm 217 carries a mercury contact tube with contacts 225. Contact is made when the arm 217 is in the lowermost position.

Operation

In action the solenoid is energized and the arm 217 pulled up slightly so that the rear arm of the fly wire 220b is released from the indent 228 of the swinging arm 217. If the end is intact, the fly wire is held so that when the solenoid is de-energized and the swinging arm 217 drops the rear arm of the fly wire will again be caught in the indent 228.

When the end is broken the fly wire swings freely outward and when the solenoid is de-energized the swinging arm drops to the lower position thus closing the circuit of the solenoid on the interrupter.

In piecing up, the control riser 230 is released from the catch 232 which engages the casing as at 233. The riser has a spring 235 urging it upwards. In its upward movement the finger 238 of the riser 230 engages the end of the arm 217 and carries it back to the normal position. When the end is pieced up all the operator has to do is push down the riser 230 until the catch 232 is engaged. The testing motions then continue.

Units of Figures 11 and 12

Figures 11 and 12 illustrate original combinations of lappets, detectors and thread guides. As illustrated in Figure 11, the detector casing 305 is hinged to the thread board 307 by means of a hinge 308 and the thread board 307 is hinged to the roll beam by the hinge 310. A thread guide 315 is attached to a lower extension 317 of the frame of the case of the detector, which functions as a lappet through a bracket 319.

In Figure 12, similar numbers are used to identify similar parts as in Figure 11, but are raised by 100. In this case, the thread guide 415 is attached to the bottom of the detector case 405 by a usual attachment mechanism.

Unit of Figures 13 through 16

Figure 13 shows a still further form of detector unit. This unit has a block 511 with a longitudinal boring 512 constituting a cylinder. A piston assembly 515a operates in the cylinder 512. The block 511 is provided with two ports 517 and 518 leading into the cylinder. The port 517 is connected with the feed line 520. The line 520 leads from the main supply, through a hand-operated air valve 521, and an orifice 523, to a rotating valve 525 equipped with an open port 527 through which the air can be exhausted from the system. The plug of the valve 525 includes a channel 528 which will complete communication from the supply line 520 and then cut off this communication and allow air to pass out through the port 527 as it is rotated. The feed line 520 also includes a solenoid valve 530. This valve is opened automatically because of its connection to the power circuit 531 if, by any chance, the power goes off, stopping the frame. By so doing, it prevents actuation of any interrupter units if ends go slack.

The sensing member of this detecting unit is made up of a hinged plate substantially V-shaped in cross-section having an arm 540 against which the piston rod 515 is adapted to bear and a front arm 542 to which a fly wire 543 is hinged as at 545. The fly wire is substantially of the conformation shown in Figure 16. The plate is pivoted to the frame of the block at its apex as at 550. The fly wire is made so that the rear end 543a counter-balances its forward portion 543b. A hook 552 projects outwards from the body and has a downward extending portion 553.

In operation, air is supplied from the pipe 520 through the port 517 to the cylinder which pushes the piston assembly 515a in a forward direction against the rear arm 540 of the plate thus urging the fly wire 543 in an outward direction into contact with the spinning end. If the end is intact the outer edge 543b of the fly wire is pulled downward by the spinning end thus lifting the rear edge 543a upward into contact with the hook 552; its forward motion being stopped when its rear end catches in the downwardly projecting finger 553. Further motion is thus prevented until the air is exhausted through the port 527 which allows the piston and sensing member to return to the rest position.

When the end is broken, however, the fly wire does not contact this spinning end and the back of the fly wire 543a slides outward along the base under the hook 553, which allows the piston to advance past the port 518. Air under pressure then flows through this port which connects with an air line to the interrupter, actuating the latter.

For piecing up, a catch 560 is provided. This catch slides along the block 511 under the head 562 of a screw bolt screwed into the block. The catch 560 is moved in a rearward direction by pressure on a finger hold 565. The front end of the catch has a bent over portion or finger 567 which, when it is pulled back, contacts the detector plate 542 moving it in a rearward direction. The rear arm 540 contacts the end of the piston and moves it back into starting position closing the port 518. When the end is pieced up, the attendant merely moves the slide 560 forward which allows the detector to start testing again.

The key to the alternating testing motion is the rotating valve 525 in Figure 14, shown in more detail in Figure 15. To get rotating motion the valve is provided with a spindle 570 and a pulley 571 on the end of the spindle. The pulley is driven by a belt 573 from a suitable source of power. The rotation of the valve as outlined above generates the intermittent testing motion.

Unit of Figure 17

In Figure 17, the mechanism shown is similar to that in Figure 13. In this case, however, the sensing member is hinged by the end of its rear arm 640 and the forward arm 642 extends forward from the foot of the arm 640. The end of the arm 642 is adapted to contact the spinning end H when pushed forward by the piston rod 615. The air control for operating this device is shown in Figure 18. Air is admitted from the supply to the line 620 which passes through a hand valve 621, a filter 622, an orifice 623 and by a solenoid relief valve 625. A reservoir 626 is also included in the line to maintain a more even pressure.

Operation

The piston is kept in a forward position, in operation, by maintenance of a steady air pressure behind the piston head 615a, the air entering through the port 617. The arm 642 rides against the spinning end and holds the piston head from advancing further. The weight of the sensing element and the effective retarding pressure of the spinning end are developed to balance the force exerted on the piston by the air pressure. When the end breaks, its retarding force is removed which allows the sensing member to swing outwards. The piston thus moves forward past the port 618 which forms the connection with the interrupter. The block is also provided with a forwardly projecting thread guide 680 which is designed to restrict any outward displacement of the spinning end H. This helps to absorb any undue pressure of the sensing element 642 on the spinning end H.

The detector unit of Figure 19 is made up of a base plate 700 on which there is rigidly mounted a cylinder block 703. This block is provided with a cylinder 705 extending from close to the back of the block to the front. A piston 710 is operably mounted in the cylinder. The cylinder is provided with an inlet port 712 and an outlet port 715. The inlet port is connected to a supply line 717 with a source of air pressure. The outlet port 715 is connected by a supply line 719 to an interrupter unit. The piston 710 is provided with an axial air passage 725. The piston is also provided with transverse passages 727 and 728 which extend from one side to the other and which connect with the longitudinal passage 725. A groove 730 extends about the periphery of the piston 710 at the circumference where the passage 728 emerges.

A block 735 is attached to the outer end of the piston 710. This block includes a V-shaped groove 736 along its upper front edge. The piston assembly 710 may be so shaped as to include the block 735. The piston assembly is provided with a forwardly extending rod 740 at its end as at 741. A pedestal bearing block 743 extends upwardly from the base 700. The pedestal 743 is provided with a bearing 745 adapted to receive the rod 740 in a sliding fit. On the rod 740 between the pedestal bearing 743 and the block 741 is a coil spring 747.

Attached to the side of the block, in a sliding fit is a stop bracket 750. The bracket 750 is provided with a slot 751 through which a screw and spring washer hold the bracket to the body 703 and also with a finger hold 752. The block 703 is provided with a forward extending bearing bracket 753.

A fly wire or detecting element 755 is journalled in the bracket 753 as at 756. The fly wire 755 has a forwardly extending end with a transverse testing portion 758 and at the rear, on one end, a counterweight 757. This wire 755 has a cross bracket 760 and a downwardly extending rear end 759.

Operation

In operation, air is admitted through the port 712 in rear of the piston 710. This is done intermittently. With the admission of air the piston moves forward into the dotted position of Figure 23. When the piston is in neutral position the fly wire is held back by the bearing of the downwardly extending end 759 against the back of the block 735. As the piston advances, the fly wire is released and swings forward being counter-balanced by the weight 757. If the end is intact it is retained in the position shown in Figure 23, in dotted lines. The piston and block continue to move forward until the V-groove 736 in the block 735 catches the cross bar 760. Further forward motion of the piston is then thus stopped. This intermittent motion continues as long as the end is intact.

When the end breaks the fly wire can swing outward and upward to the position shown in Figure 20. This allows the block on the piston to pass under the cross bar 760 and the piston thus advances till it clears the port 715. When this occurs air under pressure flows through the line 719 to the interrupter unit.

Piecing up is as follows. The attendant first pushes back the movable bracket 750. This bracket catches the front of the block 735 and thus returns the piston to its neutral position. When this occurs the passage 728 and groove 730 coincide with the port 715. In this way the air under pressure in the interrupter connection and mechanism is released through the passage 728, the axial passage 725 and the passage 727. Piecing up is then completed and the mechanism allowed to operate again by pushing forward the holding catch 750.

*Unit of Figures 25 and 26*

A further form of a detector unit is shown in part in Figure 25. It includes a body 800 which is suitably mounted on a base attached to the lappet. The number 810 denotes a piston similar to the piston 710 of Figures 19 to 24. It includes an axial channel 825 and a transverse channel 827 and is otherwise similar to the piston 710 except that it is not provided with the front end mechanism as will be evident.

The block 800 is provided at the bottom with a forward extension 815 having an upwardly extending finger 817. The block 800 is also provided at the top with forward brackets 829. A bearing bracket, of the type substantially as indicated in the drawings, 830 is pivotally mounted as at 832 to the forward brackets 829 of the cylinder block. The bracket 830 is provided with a cross bar 835 which serves as a bearing plate for the front end of the piston 828. Adjacent the bottom part of the bracket are two swinging members, a catch member 840 and a testing member 845. The catch member is provided with an indented portion which fits over the finger 817.

In operation this is a continuous testing device. The piston 810 is subjected to constant air pressure which moves it forward and holds it against the cross bar 835. This action pushes the bracket 830 forward about the pivot 832. When it reaches the point that the finger 841 of the member 840 contacts the finger 817 the forward motion of the bracket is stopped by the fact that rotation of the member 840 is prevented by contact with the finger of the detecting element 845. The detecting element 845 in turn is prevented from rotation by contact of its testing edge with the spinning end.

When the spinning end breaks the parts move into the position shown in Figure 26. This allows the piston to advance and clear a port to the interrupter as shown in Figure 24.

Piecing up is as follows. The bracket mechanisms are reset by hand and held by a catch similar to that shown in Figure 24 while piecing up is completed. After piecing up the catch is released and testing continues.

The detecting apparatus of the present application can be used in conjunction with interrupting apparatus as, for example, in either co-pending application Serial No. 142,222 filed February 3, 1950, which issued as Patent 2,611,230, or co-pending application Serial No. 202,928 filed December 27, 1950.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A device of the type described comprising a body, a sensing member pivotally mounted to a forward end of the said body by a horizontal pivot for rotational movement in a forward direction, said sensing member including a rearwardly and downwardly extending rear plate and a forwardly and downwardly extending front plate, a sensing element horizontally pivoted to said bottom end of the front plate and having a forwardly extending portion adapted to contact a strand and a rearwardly extending portion, a hook member extending outwardly from the body adjacent to the lower end of the front plate and having a downwardly extending finger, a body including a horizontally extending cylinder, a piston operative in said cylinder, an air entrance port normally behind said piston, an exhaust normally covered by said piston, an air supply to the entrance port, and means for establishing an intermittent air supply whereby the piston is moved forward against said rear plate whereby the sensing element is adapted to contact the strand when the strand is intact, whereby the strand depresses the end of the sensing element causing the rear portion to be raised whereby it engages said finger preventing a further forward movement of the piston, but when the strand is not intact the front end of the sensing element is not depressed and the rear end does not engage said finger and the piston is allowed to move forward to uncover said exhaust port.

2. A device according to claim 1, wherein there is a latch member mounted for horizontal sliding movement on said body, said latch member having a finger adapted to engage said sensing member and to move it in rearward direction to set the device after the breaking of a strand.

3. A sensing element for a detecting mechanism, comprising a member substantially V-shaped in cross-section and having a rear plate fitted to drop downwardly from a substantially horizontal pivot and a front plate adapted to extend downwardly diagonally from the pivot, a sensing element pivotally mounted to the bottom of the front plate and having a forwardly extending portion adapted to engage a strand and a rearwardly extending portion.

4. A device of the type described including a housing, a substantially horizontal cylinder in said housing, an inlet and an outlet port in said housing leading to said cylinder, a piston in the cylinder adapted normally to close the outlet port and to be positioned in advance of the inlet port, a detecting assembly pivotally mounted on said housing in advance of said piston and arranged so that the piston bears against it, said assembly including a pivoted arm, said arm including a first finger adapted to engage a strand of fibers, and a second finger at an angle to the first, a latch member pivotally mounted on said assembly including a part adapted to engage said second finger and a part projecting in an opposite direction, and a finger connected to said housing and adapted to engage said part extending in the opposite direction, the assembly including a part engaging the end of said piston, the assembly normally being prevented, when the strand is intact, from moving forward under the influence of said piston by engagement of said latch member with said finger and the restraint of said latch member by said pivoted arm.

5. A device of the type described including a housing, a sensing assembly including a body pivotally mounted on said housing, means normally tending to urge said body in the direction of a strand of fibers being spun, said body having a forwardly extending portion and a downwardly extending portion, an arm pivotally mounted on said forwardly extending portion, a first finger on said arm for engaging a strand, a second finger extending at an angle from said first finger, said downwardly extending portion including a latch-lever having long and short arms pivotally mounted thereon, the long arm adapted to engage the second finger, and the short arm adapted to engage a finger on said housing, the latch-lever normally being held by said second finger in a position so that its opposite portion engages the finger of said housing and thereby retains the body from forward movement, but when the first finger is released by the strand the latch-lever is released to allow forward movement of the body.

6. A sensing member for a strand break detecting mechanism comprising a body adapted to be pivoted on a substantially horizontal pivot, to hang downwardly therefrom, a sensing element pivotally mounted on a lower portion of said member, a catch member also pivotally mounted on a lower portion of said member, said catch member adapted to be supported by said sensing element when said sensing element is supported by a strand, means for acting on said body to urge it in the direction of the strand, the movement of said last named means being normally limited by said catch member when the strand is intact.

7. A device of the type described comprising a housing, a sensing member pivotally mounted on said housing, said sensing member including a body adapted to hang from said pivotal mounting, a pivoted sensing element on said body, a catch member mounted on said body adapted to engage said sensing element when the sensing element is held by an intact strand but to be released from engagement when the sensing element is released by the strand, means on said housing for engagement of said catch member when said catch member is held by said sensing element but to be released by said catch member when the catch member is released by said sensing element, and means for acting on said body to urge it in the direction of the strand, the movement of said means being normally limited by said body when the strand is intact.

References Cited in the file of this patent

UNITED STATES PATENTS

| | | |
|---|---|---|
| 1,415,917 | Bentley | May 16, 1922 |
| 1,727,285 | Gullung | Sept. 3, 1929 |
| 1,735,102 | Arragg | Nov. 12, 1929 |
| 1,819,634 | Bartholomew | Aug. 18, 1931 |
| 1,985,396 | Arragg | Dec. 25, 1934 |
| 2,045,079 | Haas | June 23, 1936 |
| 2,077,525 | Mennesson | Apr. 20, 1937 |
| 2,278,333 | Schaum | Mar. 31, 1942 |
| 2,281,188 | White | Apr. 28, 1942 |
| 2,289,602 | Taylor | July 14, 1942 |
| 2,367,768 | Gibbs et al. | Jan. 23, 1945 |
| 2,481,185 | Winslow | Sept. 6, 1949 |
| 2,500,343 | Carrette | Mar. 14, 1950 |
| 2,620,518 | Harstin | Dec. 9, 1952 |

OTHER REFERENCES

Ser. No. 373,136, Wiggermann (A. P. C.), published Apr. 27, 1943.